United States Patent
Sandy

(10) Patent No.: US 9,445,031 B2
(45) Date of Patent: Sep. 13, 2016

(54) ARTICLE OF CLOTHING

(71) Applicant: Matt Sandy, Elmsford, NY (US)

(72) Inventor: Matt Sandy, Elmsford, NY (US)

(*) Notice: Subject to any disclaimer, the term of this patent is extended or adjusted under 35 U.S.C. 154(b) by 0 days.

(21) Appl. No.: 14/120,801

(22) Filed: Jul. 1, 2014

(65) Prior Publication Data
US 2015/0189133 A1  Jul. 2, 2015

Related U.S. Application Data

(63) Continuation-in-part of application No. 13/999,005, filed on Jan. 2, 2014.

(51) Int. Cl.
| | |
|---|---|
| *H04N 5/225* | (2006.01) |
| *H04N 5/44* | (2011.01) |
| *H04N 5/232* | (2006.01) |
| *A45F 5/02* | (2006.01) |
| *A45F 5/00* | (2006.01) |

(52) U.S. Cl.
CPC ......... *H04N 5/44* (2013.01); *A45F 5/02* (2013.01); *H04N 5/23206* (2013.01); *A45F 2005/006* (2013.01)

(58) Field of Classification Search
CPC .................................................. H04N 5/2252
See application file for complete search history.

(56) References Cited

U.S. PATENT DOCUMENTS

| | | | | |
|---|---|---|---|---|
| 6,349,824 | B1 * | 2/2002 | Yamada | G03B 17/08 150/165 |
| 2003/0133008 | A1 * | 7/2003 | Stephenson | H04N 5/2251 348/47 |
| 2006/0262192 | A1 * | 11/2006 | Ejima | H04N 5/2252 348/207.99 |
| 2007/0005795 | A1 * | 1/2007 | Gonzalez | G06F 17/30017 709/232 |
| 2007/0122106 | A1 * | 5/2007 | Ohnishi | 386/46 |
| 2008/0048861 | A1 * | 2/2008 | Naidoo et al. | 340/541 |
| 2010/0020185 | A1 * | 1/2010 | Sako et al. | 348/211.1 |
| 2011/0149117 | A1 * | 6/2011 | Vendrig | 348/239 |
| 2011/0157421 | A1 * | 6/2011 | Chuang | H04N 1/00307 348/231.2 |

* cited by examiner

*Primary Examiner* — Roberto Velez
*Assistant Examiner* — Stephen Coleman

(57) ABSTRACT

An article of clothing has at least one element of clothing wearable by a user, and a recording camera constructed to operate wirelessly associated with the element of clothing and carrying out recording processes while being associated with the element of clothing.

16 Claims, 6 Drawing Sheets

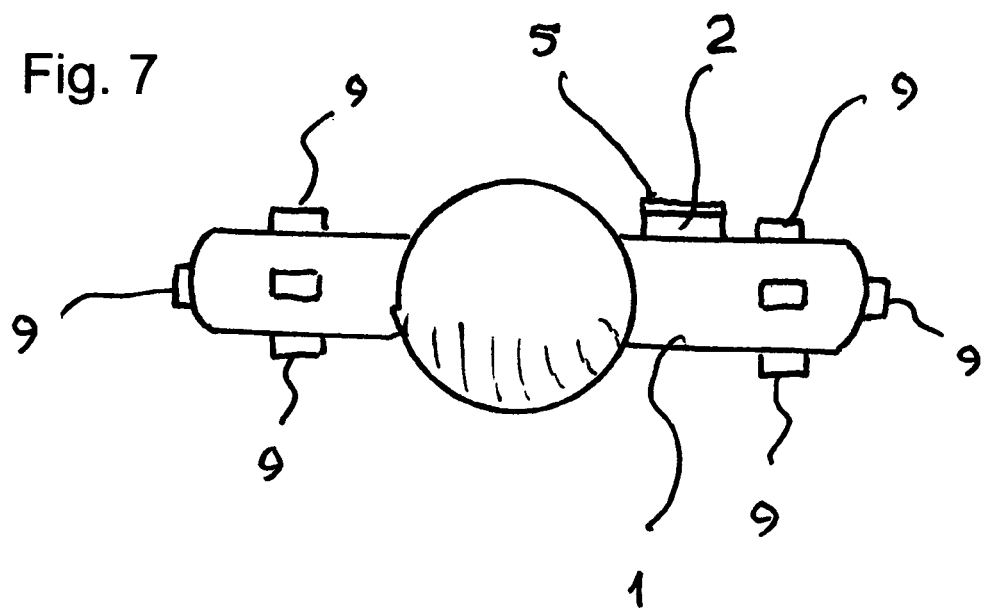
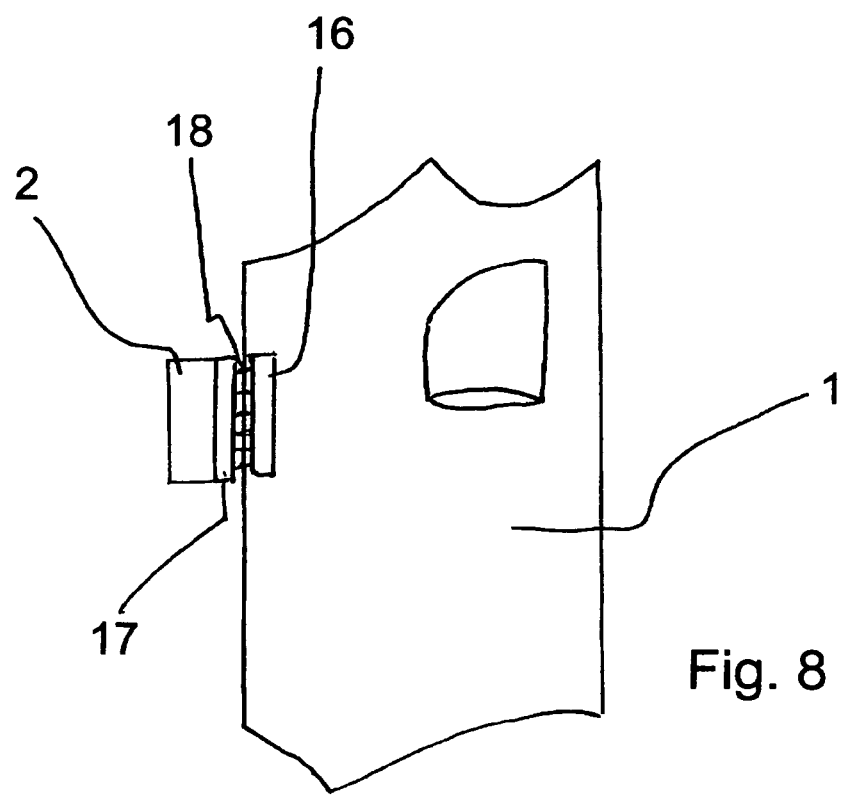

ARTICLE OF CLOTHING

BACKGROUND OF THE INVENTION

The present invention relates to articles of clothing wearable by users on various occasions.

Articles of clothing are widely known and worn by users for the major purposes of covering parts of a human body. It is believed however that it would be advisable to construct articles of clothing in such a way that, in addition to their main function of covering parts of human body, they can also perform other different functions which are not related to the wearing function only, but carry out other actions which can be important in lives of people.

SUMMARY OF THE INVENTION

Accordingly, it is an object of the present invention to provide an article of clothing which is a further improvement of the existing articles of clothing.

In keeping with these objects and with others which will become apparent hereinafter one feature of the present invention resides, briefly stated, in an article of clothing which has at least one element of clothing, and a recording camera associated with said element of clothing and carrying out a recording process while being associated with said element of clothing.

In accordance with a further feature of the present invention, the digital recording camera is constructed to be arranged on an outer surface of the element of clothing, and at least one or a plurality of cover pieces can be provided which are constructed to cover a front side of the camera, leaving unobstructed only an objective or a recording window of the camera, wherein the cover pieces can have different front faces which can be compatible with the front face of the element of clothing.

In accordance with another feature of the present invention, the article of clothing is provided with at least one receptacle, in which the recording camera is received so that its objective remains unobstructed.

In accordance with a further feature of the present invention the recording camera has a plurality of sensing elements locatable on a plurality of sides of the element of clothing and carrying out the recording process on different sides of the element of clothing or over an area of 360 degrees.

Still a further feature of the present invention is that the recording camera is constructed to carry out automated digital photography, for example, from 1 to 120 second delay with or without audio recording, as well as a video recording to record during a certain time or over a certain number of periods. These functions can be instructed by the software application on a wireless remotely operating device, for example on a cellphone, a smartphone, a tablet, and the like.

A further feature of the present invention is that the recording camera can be constructed to include a touch sensor to allow the user to tap the camera to record photos and/or videos, whether said camera is on the outer surface of the clothing or inside at least one receptacle in the clothing. "Photo(s)", "digital photo(s)", "picture(s)", "digital picture (s)", "image(s)" and "digital image(s)" are all used interchangeably herein to refer to the camera recording still images, as opposed to video recordings or moving images. These photo and/or video recording functions activated by tapping the camera can be instructed wirelessly by a software application on a remote device, such as a smartphone, tablet, and the like, wirelessly connected to the camera.

A further feature of the present invention resides in that the recording camera is provided with a motion detecting element and said camera is activated for recording when the motion detecting element detects a motion in a vicinity of the camera and therefore in the vicinity of a person who wears the article of clothing.

Still a further feature of the present invention is that the recording camera is constructed to make a plurality of digital images and/or videos, and has an activating member provided on the camera when the latter is supported by the element of clothing and activated by a user to make the digital images and/or videos.

A further feature of the present invention is that the camera is constructed as a wirelessly operated camera, and a remotely operating device is provided for operating the wireless camera, and such remotely operating device can include a cellphone, a smartphone, tablet, and the like, that can also preview in real time with a software application what the camera is viewing and/or recording.

In accordance with a further feature of the present invention, the recording camera is constructed so that the digital images, video recordings and/or audio messages can be transferred wirelessly from the camera to the remotely operating device—such as a smartphone, a tablet and the like—and viewed on, stored on and/or transferred elsewhere on the remotely operating device.

In accordance with another feature of the present invention, the recording camera can be constructed to record still images during the video recording mode, enabled by a wireless control device, for example by the software application of a smartphone and the like.

The novel features of the present invention are set forth in particular in the appended claims.

The invention itself, however, both as to its construction and its manner of operation will be best understood from the following description of the preferred embodiments, which is accompanied by the following drawings.

BRIEF DESCRIPTION OF THE DRAWING

FIGS. 6, 7 and 8 are views showing further embodiments of the inventive article of clothing;

DESCRIPTION OF THE PREFERRED EMBODIMENTS

Figure 2:
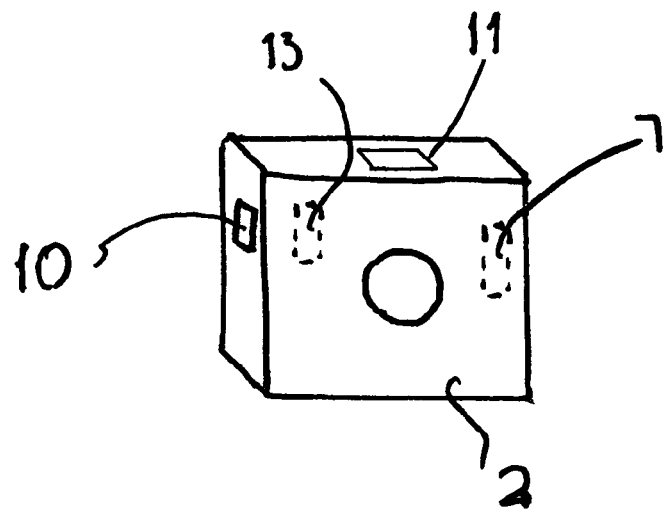
FIG. 2 is a perspective view of the recording camera in accordance with the present invention.

An article of clothing in accordance with the present invention includes an element of clothing which is identified as a whole with reference numeral 1. The article of clothing further has a recording camera which is identified as a whole with reference numeral 2 and is associated with the element of clothing 1. The recording camera 2, which is shown in FIG. 2, is constructed to carry a recording process while being associated with the element of clothing 1.

Figure 1:
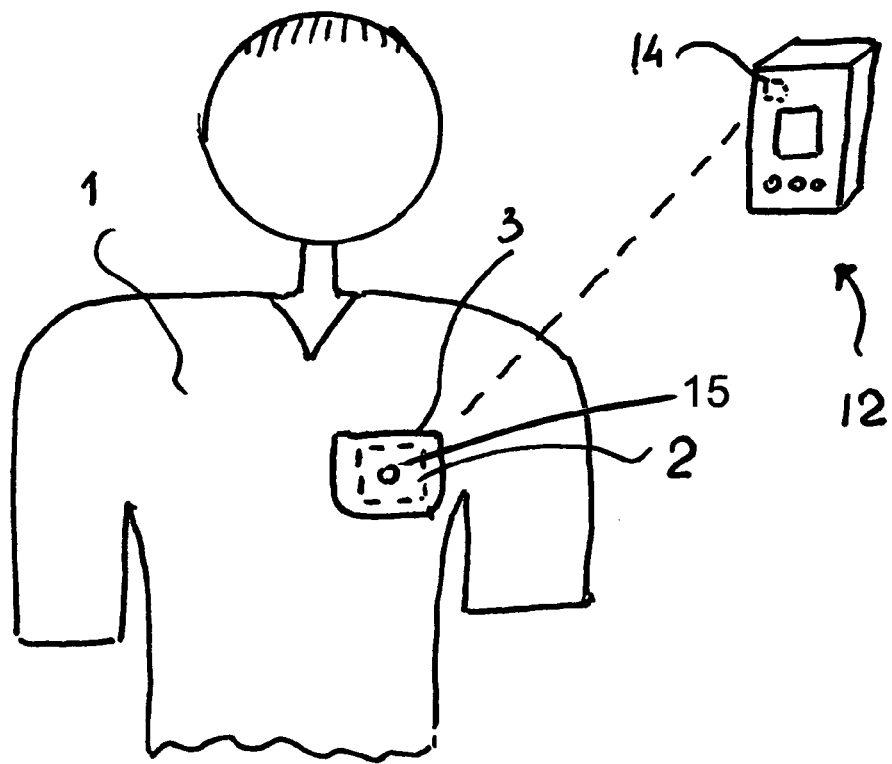
FIG. 1 of the drawings is a view showing an article of clothing according to the invention, with an element of clothing, a recording camera, and a remotely operating control device.

FIG. 1 shows that the element of clothing 1 can be provided with at least one receptacle 3, for example in form of a pocket, in which the recording camera 2 is received. In order to allow the recording process the objective of the camera remains unobstructed by the pocket 3, for example by providing a hole 15 in the pocket 3 in the area of the objective of the recording camera 2.

Figure 3:
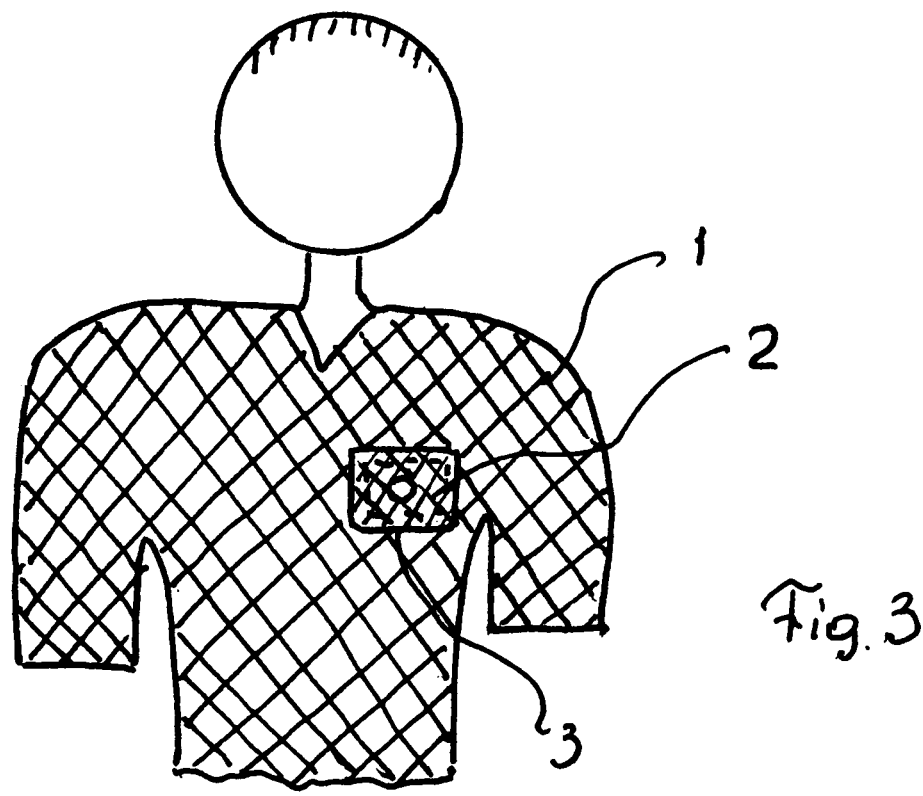
FIGS. 3 and 4 are a front view and a side view of the article of clothing in accordance with a further embodiment of, the invention.
Figure 4:
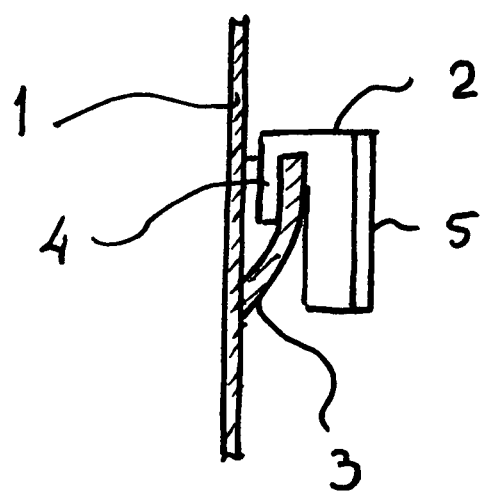
Figure 5:
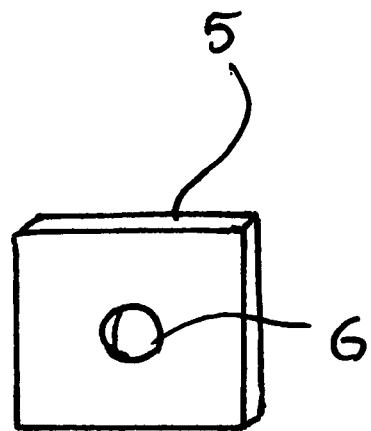
FIG. 5 is a view showing the recording camera with a cover plate in accordance with the invention.

In accordance with another feature of the present invention shown in FIGS. 3-5 the recording camera 2 can be arranged on an outer surface of the element of clothing 1, for example being connected to the latter, in particular to the pocket 3, by a clip 4, or being suspended on a necklace 8. In order to prevent undesirable recognition of the recording camera 2 on the element of clothing 1, a plurality of cover pieces 5 can be provided, each having a different face design that can correspond to the face design of the element of clothing 1. As an example, it can be seen from FIGS. 3 and 5 that both the face of the element of clothing 1 and of the cover piece 5 have a square design. Each cover piece 5 has an opening 6 for the objective of the recording camera.

Figure 6:
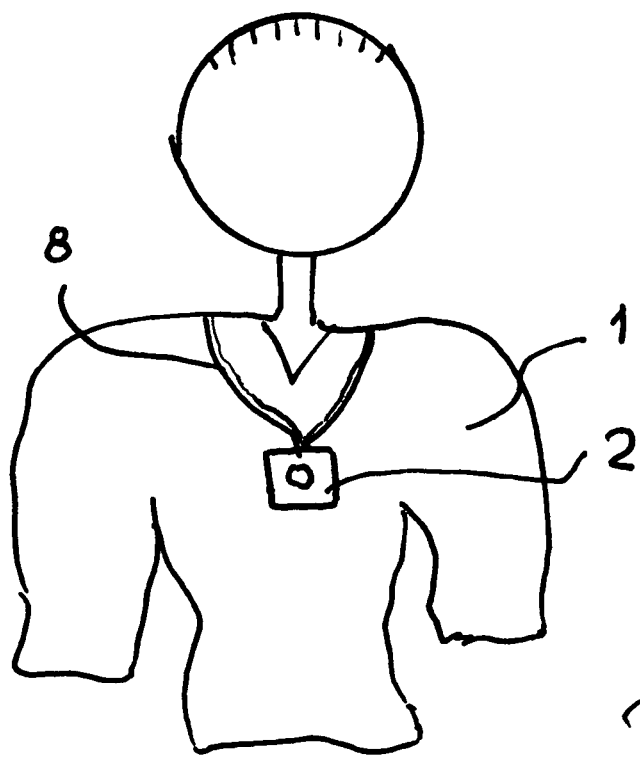

It is shown in FIG. 6 that the recording camera 2 can be suspended on a necklace or string 8 on the front surface of the element of clothing 1, and also can be covered by the cover plate 5 with a design which matches the design of the element of clothing 1. As shown in FIG. 8, the recording camera can be attached to the article of clothing with a magnet clip attachment comprised of two parts: a magnet attachment 16 that is inserted behind the article of clothing 1 and a clip 17 with a magnet inside it that attaches to the camera 2 and placed in front of the article of clothing 1 subsequently gripping the magnet attachment 16 by way of the magnets inside both parts bonding together 18.

As shown in FIG. 7 the recording camera 2 can be operatively connected, for example wirelessly, with image sensors 9 which can be arranged on the element of clothing 1 on its front, rear, left, right sides so as to receive signals from the image sensors 9 and to carry out a panoramic recording on several sides, even over 360 degrees around the user. The image sensors 9 can be arranged additionally even on top and on the bottom of the element of clothing 1 to carry a three-dimensional recording around the user.

The recording camera 2 can be constructed to carry out different types of recordings with or without an audio recording. In particular it can carry out an automated digital photo capture, for example from 1 to 120 seconds delay with or without audio recording. It can also carry out a video recording to record during a certain time, or to record over a certain number of periods.

As shown in FIG. 2 the recording camera 2 can be provided with a motion detecting element 10. It is constructed so that it detects a motion in the vicinity of the camera and therefore of the user, and can consequently activate the recording camera 2 automatically, just in response to the motion detection.

The recording camera 2 has a control or activating element 11 formed, for example, as a control button, with which the user operates to carry out the above mentioned recording processes performed by the camera. The control or activating element 11 can also activate the recording camera to carry out making a plurality of digital photos. The control element of the camera 2 can be customized to perform different recording functions by instructing it with a software application on a remote device, such as a smartphone, tablet, and the like, wirelessly connected to the camera.

While the recording process can be selected and activated directly on the recording camera 2 by the control or activating element 11, in accordance with another advantageous feature of the present invention, the recording camera 2 can be constructed as wirelessly operating recording camera, and a remotely operating control device 12 can be provided for remotely operating the recording camera to carry out the desired recording processes on the recording camera. The remotely operating control device 12 can be formed as any correspondingly constructed electronic device, such as a smartphone, tablet, and the like, capable of previewing on its display in real time with a software application what the camera is viewing and/or recording.

In accordance with a still important and highly advantageous feature of the present invention the recording camera 2 and the remotely controlling device 12 can be constructed to operate so that the recorded photos, video images and/or audio messages can be stored in the memory 13 of the recording camera 2, or can be transferred to the remotely operating control device 12 and stored in the memory 14 of the latter, for subsequent retrieval, for example for viewing, transferring, copying.

Furthermore, the recording camera 2 can be constructed so that it can simultaneously carry out a photography recording during a video recording, and it can be remotely controlled by the remotely controlling device wirelessly, to store, exchange and reproduce after the storing the photo and video images recorded by the recording camera 2.

As shown in FIG. 2 the camera can be constructed to include a touch sensor 7 to allow a user to tap the camera, whether said camera is on the outer surface of the article of clothing 1 or inside a receptacle of the article of clothing 1, to perform recording functions. Specifically, the user can tap the camera 2 to snap a photo. Alternately the user can tap the camera to "retro-save" videos recordings of previous events that have occurred. "Retro-save" means that the camera 2 stores in its memory 13 only a specific duration of a video recording of events that have occurred just prior to the user tapping the camera. The user can customize the duration of the video recording of the previous events the user wishes the camera to store in its memory 13. For example the camera 2 can be set by the user to only store in its memory 13 the previous five minutes of action upon tapping the camera. These photo and/or video recording functions activated by tapping the camera can be instructed wirelessly by a software application on a remote device, such as a smartphone, tablet, and the like, wirelessly connected to the camera.

Figure 9:
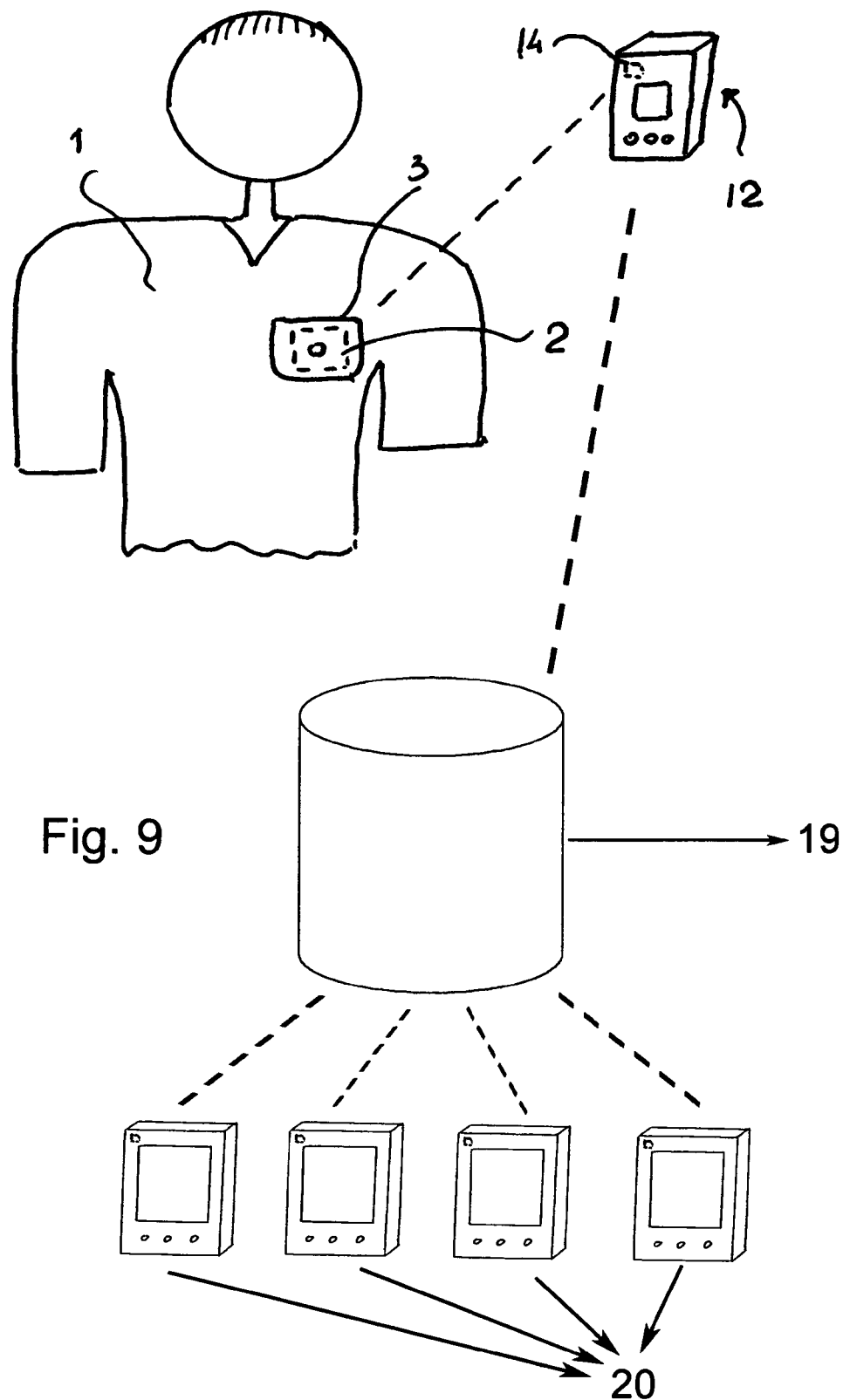
FIG. 9 is a view showing the recording camera and a remotely operating control device connected to a data server in accordance with the invention.

In accordance with a still important and highly advantageous feature of the present invention, as shown in FIG. 9, the recording camera 2 can connect wirelessly to a data server 19 through its wireless connectivity to the remotely controlling device 12. The recorded photos, videos images and/or audio messages can be transferred wirelessly from the recording camera 2 to the data server 19 by way of the remotely controlling device 12—such as a smartphone, tablet and the like itself wirelessly connected to the data server 19—and stored to, exported from, and/or streamed on the data server 19 for subsequent retrieval, transferring, and/or viewing from other smart wireless devices 20, such as smartphones, tablets and the like, connected to the server.

Furthermore, the recording camera 2 can be constructed so that it can simultaneously carry out a video recording while transferring and streaming said video recordings to the data server 19, allowing for said video recordings to be viewed remotely in real time on the display screens of the other smart devices 20, such as smartphones, tablets and the like, wirelessly connected to the server 19.

Figure 10:
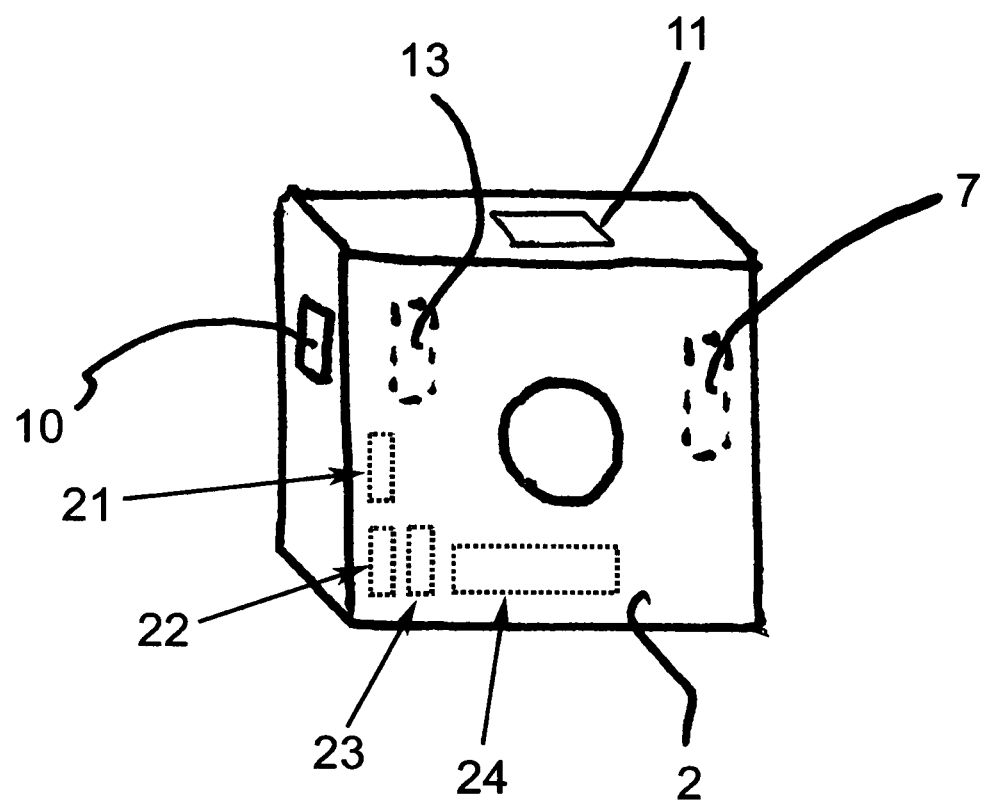
FIG. 10 is a perspective view showing a further embodiment of the camera.

In accordance with a further feature of the present invention, as shown in FIG. 10, the recording camera 2 can be constructed to include a processing unit 21, a WiFi module 22, a bluetooth module 23, and an internal battery 24, such as a lithium ion battery typically used in digital camera devices. The recording camera 2 can be controlled by a remotely wireless operating control device, such as a smartphone, a tablet, a smartwatch, and the like, connected wirelessly to the WiFi module and/or the bluetooth module of the camera. As an example, the wireless remotely operating device can be used to preview in real time the video recording being performed by the camera associated with the article of clothing. The recording settings of the recording camera 2 can be changed by a software application operating on the remote control device by syncing wirelessly to the WiFi and/or bluetooth module of the digital camera.

The invention is not limited to the details shown since various modifications and structural changes are possible without departing in any way from the spirit of the invention.

What is desired to be protected by Letters Patent is set forth in particular in the appended claims.

The invention claimed is:

1. An article of clothing, comprising
at least one element of clothing wearable by a user on the torso of the user to cover the torso of the user; and
a recording camera arranged on the outside of the surface of said element of clothing and constructed for carrying out a recording process while being associated with said element of clothing that is wearable by a user on the torso of the user to cover the torso of the user, wherein said recording camera has a built in touch sensor whereby, instead of pressing a button on the camera, the user can physically tap the camera body to activate digital image or a digital video recording, wherein said digital image or video recording is storeable in the internal memory of the said camera upon tapping, wherein said camera is settable to continuously record visual image data and upon the user tapping said camera body, said camera will only save to its internal memory the visual recordings of the last number of minutes previously selected by the user.

2. An article of clothing as defined in claim 1 wherein said camera is constructed to wirelessly stream live visual image data in real time to a data server so that the visual images said camera is streaming in real time to a data server can be observed by users remotely connected to said data server.

3. An article of clothing as defined in claim 1, wherein said camera is constructed to carry out recordings selected from the group consisting of an audio recording, a video recording, digital image recording, automated digital image recording, a video recording to record over a certain time or over a number of periods, and combinations thereof, wherein said recording camera is constructed as a wirelessly operated recording camera that is controllable wirelessly by a remotely operating controlling device to enable said recording camera to carry out the recording process, and said recording camera can transfer wirelessly to said remotely operating controlling device the images, video recordings and/or audio messages recorded by said camera so that the said remotely operating controlling device can store, exchange and/or reproduce said images, videos recordings and/or audio messages recorded by said recording camera.

4. An article of clothing as defined in claim 3, wherein said recording camera has a plurality of sensing elements arrangeable on various sides of said element of clothing and constructed to carry out recording on said sides to provide a panoramic and/or 360 degree recording.

5. An article of clothing as defined in claim 3, wherein said element of clothing has at least one receptacle in which said recording camera is receivable, wherein the article of clothing has a hole through which the lens objective of the camera remains unobstructed while residing in the receptacle, so that the only the lens objective of the camera is visible on the surface of the article of clothing.

6. A clothing accessory as defined in claim 3, wherein the duration of the said visual recordings is changeable by the user with a remotely wireless operating device.

7. An article of clothing, comprising
at least one element of clothing wearable by a user on the torso of the user to cover the torso of the user; and
a recording camera constructed as a wirelessly operated recording camera arranged on the outside of the surface of said element of clothing that is wearable by a user on the torso of the user to cover the torso of the user, further comprising a cover piece constructed as an ornamental cover piece which covers one surface of the recording camera, wherein the recording camera has an objective which is exposed on said one surface of said camera, wherein said ornamental cover piece is a single piece detachably attachable to said one surface of said recording camera in surface-to-surface contact with said one surface of said recording camera to cover only said one surface of said recording camera and has an opening through which said objective of said recording camera is exposed, wherein said camera is settable to continuously record visual image data whereby upon the user tapping said camera body, said camera will only save to its internal memory the visual recordings of the last number of minutes previously selected by the user.

8. An article of clothing as defined in claim 7, wherein said camera has a built in touch sensor, so that it is controllable by physically tapping the said camera, rather than by pressing a control button on the camera, in order to record a digital image or to record a digital video recording, wherein said digital image and/or video recording is storable in the internal memory of the said camera upon tapping.

9. An article of clothing as defined in claim 7, wherein the duration of the said retro saved video recordings is changeable by the user with a remotely wireless operating device.

10. An article of clothing as defined in claim 7, wherein said camera is constructed to carry out recordings selected from the group consisting of an audio recording, a video recording, digital image recording, automated digital image recording, a video recording to record over a certain time or over a number of periods, and combinations thereof, wherein said recording camera is constructed as a wirelessly operated recording camera that is controllable wirelessly by a remotely operating controlling device to enable said recording camera to carry out the recording process, and said recording camera can transfer wirelessly to said remotely operating controlling device the images, video recordings and/or audio messages recorded by said camera so that the said remotely operating controlling device can store, exchange and/or reproduce said images, videos recordings and/or audio messages recorded by said recording camera.

11. An article of clothing as defined in claim 10, wherein said recording camera has a plurality of sensing elements arrangeable on various sides of said element of clothing and constructed to carry out recording on said sides to provide a panoramic and/or 360 degree recording.

12. An article of clothing as defined in claim 10, wherein the said camera is attachabable to the article of clothing with a magnet clip that attaches from the inside of the article of clothing to the said camera on the outside of the article of clothing by way of magnetizing, by attaching said camera to the article of clothing with a clip to the outside of the article of clothing, or wearing said camera around the neck by attaching said camera to a lanyard or necklace of any material.

13. An article of clothing as defined in claim 10, wherein the activating element control button of the camera is customizable to perform different recording functions by instructing it with a software application on a remote device wirelessly connected to the camera.

14. An article of clothing as defined in claim 10, wherein said camera has a built in touch sensor, so that it is controllable by physically tapping the said camera, rather than by pressing a control button on the camera, in order to record a digital image or to record a digital video recording, wherein said digital image and/or video recording is storeable in the internal memory of the said camera upon tapping.

15. An article of clothing as defined in claim 14, wherein the duration of the said retro saved video recordings is changeable by the user with a remotely wireless operating device.

16. An article of clothing as defined in claim 14, wherein the said camera is attachable to the article of clothing with a magnet clip that attaches from the inside of the article of clothing to the said camera on the outside of the article of clothing by way of magnetizing, by attaching said camera to the article of clothing with a clip to the outside of the article of clothing, or wearing said camera around the neck by attaching said camera to a lanyard or necklace of any material.

* * * * *